(12) United States Patent
Mansour et al.

(10) Patent No.: US 11,561,802 B2
(45) Date of Patent: Jan. 24, 2023

(54) SYSTEM, METHOD, AND COMPUTER PROGRAM FOR A MICROSERVICE LIFECYCLE OPERATOR

(71) Applicant: Amdocs Development Limited, Limassol (CY)

(72) Inventors: Edwar Adib Mansour, Upper Galilee (IL); Igor Troyanovski, Beer Sheva (IL); Eyal Reuven, Netanya (IL); Cedric Gegout, Rennes (FR)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 65 days.

(21) Appl. No.: 16/878,442

(22) Filed: May 19, 2020

(65) Prior Publication Data

US 2021/0365272 A1    Nov. 25, 2021

(51) Int. Cl.
| | |
|---|---|
| *G06F 19/00* | (2018.01) |
| *G06F 9/445* | (2018.01) |
| *G06F 11/14* | (2006.01) |
| *G06F 9/54* | (2006.01) |
| *G06F 9/48* | (2006.01) |
| *G06F 3/06* | (2006.01) |
| *H04L 41/0654* | (2022.01) |

(52) U.S. Cl.
CPC ........ *G06F 9/44505* (2013.01); *G06F 9/4856* (2013.01); *G06F 9/547* (2013.01); *G06F 11/1415* (2013.01); *G06F 3/067* (2013.01); *G06F 2201/805* (2013.01); *G06F 2201/865* (2013.01); *H04L 41/0654* (2013.01)

(58) Field of Classification Search
CPC ........ G06F 9/455; G06F 9/547; G06F 9/4856; G06F 11/1451; G06F 3/067; G06F 2201/805; G06F 2201/865; G06F 9/44505; H04L 41/0654; G06N 20/00
See application file for complete search history.

(56) References Cited

U.S. PATENT DOCUMENTS

| | | | |
|---|---|---|---|
| 11,010,218 B1* | 5/2021 | Karaya | G06F 9/547 |
| 11,074,091 B1* | 7/2021 | Nayakbomman | G06F 9/455 |
| 2017/0187785 A1 | 6/2017 | Johnson et al. | |
| 2018/0054355 A1 | 2/2018 | Balser et al. | |
| 2019/0349429 A1 | 11/2019 | Jain et al. | |
| 2020/0301782 A1* | 9/2020 | Radhakrishnan | G06N 20/00 |
| 2021/0103392 A1* | 4/2021 | Murray | G06F 3/067 |
| 2021/0111942 A1* | 4/2021 | Tahhan | H04L 41/0654 |

(Continued)

FOREIGN PATENT DOCUMENTS

| | | |
|---|---|---|
| CN | 108268271 A | 7/2018 |
| CN | 109995586 A | 7/2019 |

OTHER PUBLICATIONS

Dobies and Wood, "Kubernetes Operators—Automating the Container Orchestration Platform" O'Reilly, Mar. 2020, chp. 1-10, pp. 1-136 <Dobies_KbnOperators.pdf>.*

(Continued)

*Primary Examiner* — Tuan A Vu
(74) *Attorney, Agent, or Firm* — Zilka-Kotab, P.C.

(57) ABSTRACT

As described herein, a system, method, and computer program are provided for a microservice lifecycle operator. In use, at least one specification for a microservice is identified. Further, a lifecycle of the microservice is managed, using a lifecycle operator and the at least one specification.

10 Claims, 8 Drawing Sheets

(56) References Cited

U.S. PATENT DOCUMENTS

2021/0132974 A1* 5/2021 Watt, Jr. ............... G06F 9/4856
2021/0149769 A1* 5/2021 Balcha ............... G06F 11/1451

OTHER PUBLICATIONS

International Search Report and Written Opinion from PCT Application No. PCT/IB2021/053894, dated Aug. 4, 2021.
Ibryam et al., "Kubernetes Patterns Reusable Elements for Designing Cloud-Native Applications" Red Hat, 2019, 266 pages.
GitHub, "operator-framework/operator-sdk," GitHub, 2020, 2 pages, retrieved from https://github.com/operator-framework/operator-sdk on May 19, 2020.
Jenkins, "Extending with Shared Libraries," Jenkins, 2020, 11 pages, retrieved from https://www.jenkins.io/doc/book/pipeline/shared-libraries/ on May 19, 2020.

* cited by examiner

SYSTEM, METHOD, AND COMPUTER PROGRAM FOR A MICROSERVICE LIFECYCLE OPERATOR

FIELD OF THE INVENTION

The present invention relates to application lifecycle management.

BACKGROUND

Application lifecycle management generally refers to the management of a multitude of activities performed during the life of a software application, from creation to deployment to support and possibly even retirement. For example, an application lifecycle can include the creation of the specification for the application, creation of the design for the application, development of the application, testing of the application, deployment of the application, and support for the deployed application. Various management platforms exist for management of applications as a whole.

Recently, microservices have begun to be used as a basis for application development. In general, microservices refer to a collection of services that are loosely coupled to form an application. In a microservice architecture, services can be fine-grained and the protocols can be lightweight. However, to date, lifecycle management for microservices has been limited. There is thus a need for addressing these and/or other issues associated with the prior art.

SUMMARY

As described herein, a system, method, and computer program are provided for a microservice lifecycle operator. In use, at least one specification for a microservice is identified. Further, a lifecycle of the microservice is managed, using a lifecycle operator and the at least one specification.

DETAILED DESCRIPTION

Figure 1:
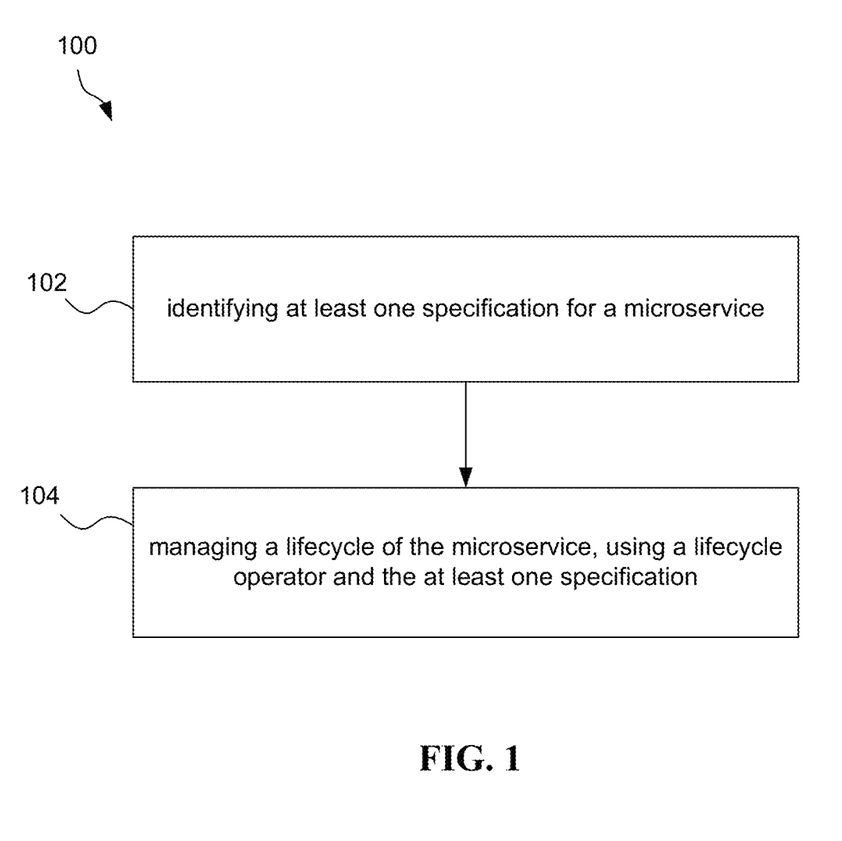
FIG. 1 illustrates a method for microservice lifecycle management using a lifecycle operator, in accordance with one embodiment.

FIG. 1 illustrates a method 100 for microservice lifecycle management using a lifecycle operator, in accordance with one embodiment. The method 100 may be performed by a platform of a provider system that manages microservices, optionally for third party entities (e.g. communication service providers, etc.). The platform may be any system of computing devices. For example, the method 100 may be performed in the context of one or more of the devices described below with reference to FIGS. 5 and/or 6. As a further option, the method 100 may be implemented in the context of a Kubernetes architecture.

As shown in operation 102, at least one specification for a microservice is identified. The at least one specification defines the microservice. The microservice may be any service capable of being deployed with or without other microservices to form an application. In one embodiment, the at least one specification may be provided by a developer of the microservice, such as a third party entity for which the microservice is to be managed. In this case, the microservice may be used to form an application that provides a service to customers of the third party entity.

In the context of the present description, the at least one specification refers to a lifecycle contract for the microservice. The microservice specifies its lifecycle contract which allows the platform to run. In particular, the lifecycle contract includes the instructions for the lifecycle of the microservice, which is used by the platform to manage the lifecycle of the microservice. In one embodiment, the at least one specification may include a microservice specification. The microservice specification may be a high level declarative description of the microservice. For example, the microservice specification may indicate image details for the microservice, identity information (e.g. users, etc.) for the microservice, technical roles for the microservice, a configuration for the microservice, or any other information that defines the microservice.

In another embodiment, the at least one specification may include a config binding specification. The config binding specification may bind a predefined configuration (not included in the microservice specification) for the microservice. Thus, the predefined configuration may not necessarily be specifically/uniquely defined for the microservice. In the embodiment of the Kubernetes architecture, the config binding specification may be usable to determine all configmaps targeting the microservice. In the context of the Kubernetes architecture, the configmaps hold key-value pairs of configuration data that can be consumed in pods or used to store configuration data for system components such as controllers. Thus, the configmaps may act as a reference to multiple properties files that define properties for the bound microservice.

Further, in operation 104, a lifecycle of the microservice is managed, using a lifecycle operator and the at least one specification. The lifecycle of the microservice refers to a series of stages for the microservice, such as for example the creation, deployment, operation, and/or retirement of the microservice. To this end, management of the lifecycle of the microservice may refer to management of the activities utilized to achieve the lifecycle stages for the microservice.

The lifecycle operator is an application-specific controller that is executable to manage the lifecycle of the microservice, such as by orchestrating activities for deployment and operation of the microservice. In one embodiment, the lifecycle operator may be a Kubernetes operator configured to manage the lifecycle of the microservice. For example, the Kubernetes operator may extend the Kubernetes application programming interface (API) to create, configure, and manage instances of the microservice (e.g. and further complex stateful applications that include the microservice), on behalf of a Kubernetes user.

As noted above, the lifecycle operator manages the lifecycle of the microservice using the at least one specification (e.g. the lifecycle contract). Where the specification includes the microservice specification, the lifecycle operator may manage the lifecycle of the microservice by transforming the microservice specification into low-level steps and resources to provision the microservice. The resources may include a deployment with a same name as the microservice, public Key Infrastructure (PKI) resources for server and client side, a service resource with properly named ports, etc.

Where the specification includes the config binding specification, the lifecycle operator may manage the lifecycle of the microservice by discovering configmaps targeting the microservice (i.e. using the config binding specification), and then mounting the configmaps into Kubernetes pods for the microservice. To this end, the lifecycle operator will manage the lifecycle of the microservice according to the specification(s) identified for the microservice.

In one embodiment, the lifecycle operator may be a component of the platform that utilizes the microservice to provide at least one application (e.g. to end users). In a further embodiment, the platform may include at least one additional operator utilized for management of the microservice, where each additional operator is responsible for a specific deployment domain (e.g. security, messaging, API publishing, upgrade strategy, etc.). The lifecycle operator may invoke the at least one additional operator for the lifecycle management of the microservice. For example, where the platform includes a PKI operator that uses a PKI definition output as a resource by the lifecycle operator, the lifecycle operator may invoke the PKI operator to generate a common secret and microservice secret for use by the microservice. As another example, where the platform includes an identity manager (IDM) operator that uses a roles and users definition output as a resource by the lifecycle operator, the lifecycle operator may invoke the IDM operator to generate user authentication information for the microservice.

To this end, the platform may provide a hierarchy of operators, where the top parent operator in the hierarchy is the lifecycle operator and the additional operators, such as those mentioned above, are child operators to the lifecycle operator. When the lifecycle operator is executing the lifecycle contract for the microservice, then some steps can fail. The lifecycle operator can then take some "decision" by using the information of failure to stop, rerun, or partially execute the lifecycle contract. Those decisions are defined in the lifecycle contract, i.e. "what to do if [this] is failing". As an orchestrator, the lifecycle operator can decide to execute some lifecycle steps and to put some in pause for improving the performance of the system, in one embodiment (e.g. if one component such as Kafka is not up yet, then it can wait and execute other steps). These mechanisms can work with a feedback loop between the additional operators and the lifecycle operator (e.g. using the storage of the specification that the lifecycle operator will read). More details regarding the implementation of the lifecycle operator within the platform will be provided below with reference to the subsequent figures.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
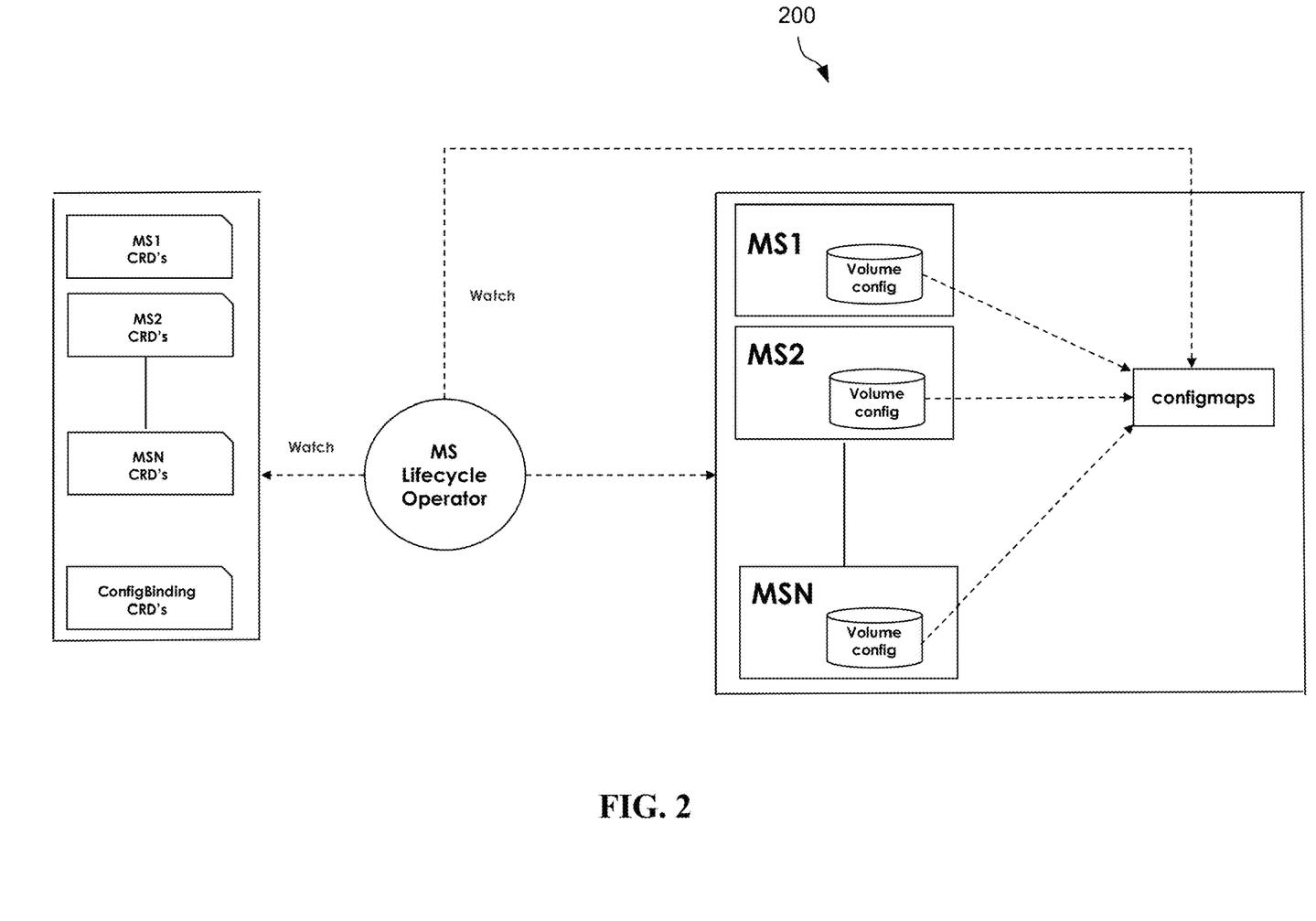
FIG. 2 illustrates a system flow diagram including a lifecycle operator for microservice lifecycle management, in accordance with one embodiment.

FIG. 2 illustrates a system flow diagram 200 including a lifecycle operator for microservice lifecycle management, in accordance with one embodiment. As an option, the system flow diagram 200 may be implemented in the context of the details of the previous figure and/or any subsequent figure(s). Of course, however, the system flow diagram 200 may be implemented in the context of any desired environment. Further, the aforementioned definitions may equally apply to the description below.

As shown, a Custom Resource Definition (CRD), which is a specification, is provided for each microservice (MS1-MSN) as well as for a config binding to be used for the microservices. The microservice lifecycle operator, which is a lifecycle operator for the microservices, uses the CRDs to manage the lifecycle of each of the microservices.

In an embodiment, the microservice CRD provides a high level declarative description of the microservice. Examples of the information included in the microservice CRD include those shown in Table 1.

TABLE 1

Microservice image details (repo, tag)
Microservice identity (name, version, domain, product)
Microservice technical roles
Full pod template configuration
Remote debugging switch
Structured JVM configuration
Requested Backing Services (Kafka topic, Couchbase bucket, . . .)
Dynamic configMap binding Table 2 illustrates an exemplary microservice CRD.

TABLE 2

```
apiVersion: app.amdocs.com/v1beta1
kind: Microservice
metadata:
  name: business-parameter-service
spec:
  version: 0.1.1-0066
  domain: business-parameter-service
  component: funtional-backend
  partOf: Catalog
  instance: basiness-parameter-service
  minReplicas: 1
  maxReplicas: {{ .Values.replicaCount. }}
  minReadySeconds: 120
  javaOptions:
    additionalOpts: {{ .Values.env.javaMemorySettings }} {{ .Values.env.javaOptions }}
    initialHeapSize: 512m
```

TABLE 2-continued

```
  maxHeapSize: 512m
  maxRam: 8024m
  maxMetaspaceSize: 256m
jvmDebug: true
containerName: business-parameter-service
template:
        metadata:
        labels;
        spec:
           containers:
                       - name: business-parameter-service
                             image: "{{ .Values.image.repository }}:{{ .Values.image.rag }}"
                             imagePullPolicy: {{ .Values.image.pullPolicy }}
{{ include "nonfunc.liveness.readiness.probe" . | indent 18 }}
              imagePullSecrets:
                 - name: {{ .Values.customPullSecretName | default .Values.image.pullSecretName }}
```

As shown, the lifecycle operator uses the microservice CRD for a microservice as well as the config binding CRD to deploy an instance of the microservice having particular volume config (i.e. cache volume). The microservice is deployed according to the microservice CRD. In particular, the lifecycle operator transforms the microservice CRD into low-level steps and resources to provision the microservice. Table 3 illustrates resources that may be created by the lifecycle operator for the microservice.

TABLE 3

Deployment with the same name as the Microservice Resource and:
Required labels
PKI and other required environment variables
Mounted PKI and IDM secrets
Mounted application configmaps - ms, domain, global, customization, env, etc
(discovered via the custom configbinding resources)
Mounted backing services credentials' secrets
PKI resources for server and client side
Service resource with properly named ports
Service Instance and Binding for backing services
IDM resources for service user, technical roles and credentials The volume config for each deployed microservice is determined by the lifecycle operator. The lifecycle operator determines the volume config from configmaps targeting the microservice. The configmaps are discovered using the config binding CRD. For example, the lifecycle operator may dynamically discover all configmaps targeting a specific microservice and will mount them into the microservice's pods. The binding may support targeting microservices based on label selectors. Further, the lifecycle operator may also bounce microservice pods if any of those configmaps/bindings changes based on a bounce policy.

Table 4 illustrates an exemplary config binding CRD for 1:1 microservice. It should be noted that this 1:1 ratio for config binding CRD to microservice is not shown in FIG. 2, but is another possible embodiment.

TABLE 4

```
apiVersion: app.amdocs.com/v1beta1
kind: ConfigBinding
metadata:
|     name: shoppingcart-config-tim-v1
spec:
|     msSelector:
|     |     |     name: shopping-cart
|     bindingRef: shopping-cart-appconfigmap-tim-v1
|     bounce: true
```

Table 5 illustrates an exemplary config binding CRD for 1:N microservices. This 1:N ratio for config binding CRD to microservice is shown in FIG. 2 as another possible embodiment.

TABLE 5

```
apiVersion: app.amdocs.com/v1beta1
kind: ConfigBinding
```

TABLE 5-continued

```
metadata:
|     name: shoppingcart-config-tim-v1
spec:
|     msSelector:
|     |     |     domain: shopping-cart
|     bindingRef: shopping-cart-appconfigmap-tim-v1
|     bounce: true apiVersion: app.amdocs.com/v1beta1
kind: ConfigBinding
metadata:
|     name: shoppingcart-config-tim-v1
spec:
|     msSelector:
|     |     |     version: 0.1.1-0066
|     |     |     domain: shopping-cart
|     |     |     component: functional-backend
|     |     |     partOf: OC
|     |     |     instance: ms-shopping-cart
|     bindingRef: shopping-cart-appconfigmap-tim-v1
|     bounce: true
```

Figure 3:
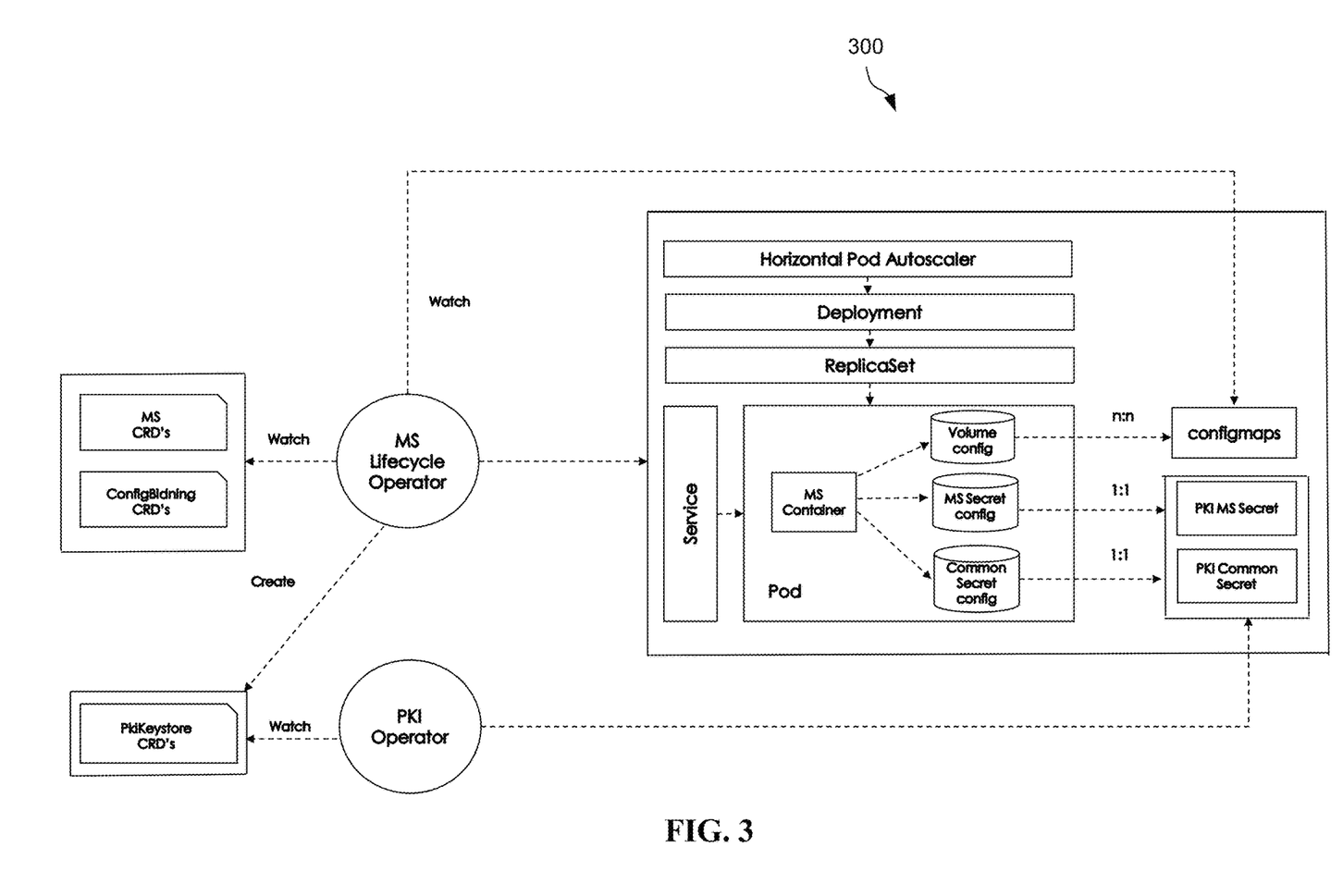
FIG. 3 illustrates a system flow diagram including a lifecycle operator and PKI operator for microservice lifecycle management, in accordance with one embodiment.

FIG. 3 illustrates a system flow diagram 300 including a lifecycle operator and PKI operator for microservice lifecycle management, in accordance with one embodiment. As an option, the system flow diagram 300 may be implemented in the context of the details of the previous figure and/or any subsequent figure(s). Of course, however, the system flow diagram 300 may be implemented in the context of any desired environment. Further, the aforementioned definitions may equally apply to the description below.

As shown, a microservice CRD is provided for a microservice and config binding CRD is provided. The lifecycle operator uses these specifications to deploy the microservice using a Kubernetes pod. The Kubernetes pod is created using an existing service and functions (horizontal pod autoscaler, deployment, replicaset).

In the embodiment shown, the lifecycle operator outputs a PKIKeystone CRD (resource) based on the microservice CRD. This resource is then used by a PKI operator to create a PKI microservice secret and PKI common secret, which are then used to configure the microservice deployment (see MS secret config and common secret config in the microservice deployment shown). The volume config for the deployed microservice is determined by the lifecycle operator as well, as described above with reference to FIG. 2.

Figure 4:
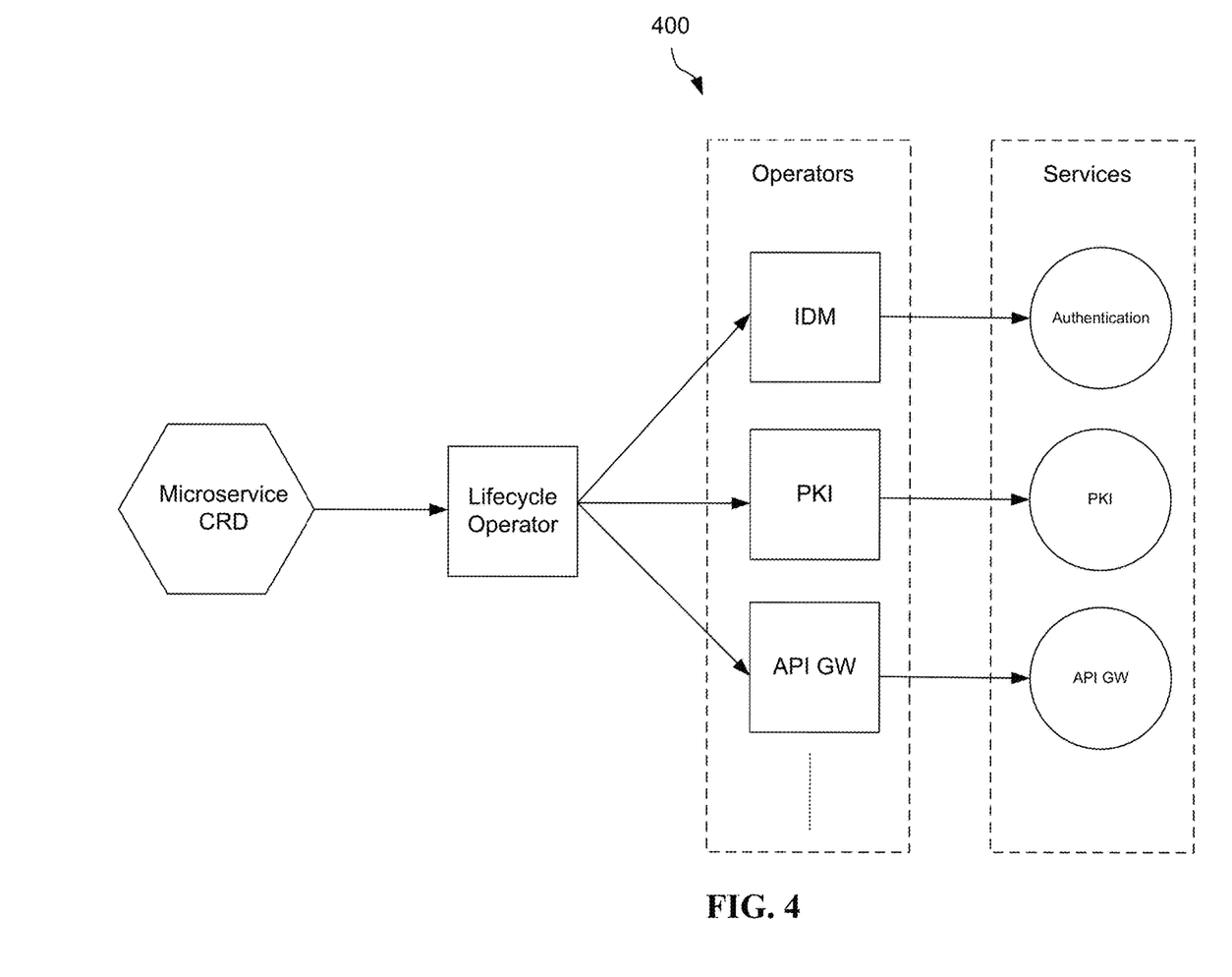
FIG. 4 illustrates a flow diagram for microservice lifecycle management using a plurality of operators, in accordance with one embodiment.

FIG. 4 illustrates a flow diagram 400 for microservice lifecycle management using a plurality of operators, in accordance with one embodiment. As an option, the flow diagram 400 may be implemented in the context of the details of the previous figure and/or any subsequent figure(s). Of course, however, the flow diagram 400 may be implemented in the context of any desired environment. Further, the aforementioned definitions may equally apply to the description below.

As shown, a microservice CRD is provided for a microservice. The microservice CRD may also include information otherwise included in a config binding CRD, in one embodiment. The lifecycle operator uses this specification to manage a lifecycle of the microservice.

In particular, in the embodiment shown, the lifecycle operator invokes additional operators based on the microservice CRD. The lifecycle operator can output resources required by the additional operators to perform one or more tasks contributing to the management of the lifecycle of the microservice. The additional operators may include, as shown, an IDM operator, PKI operator, API gateway (API GW), and/or others. As shown, the additional operators may invoke services (e.g. authentication service based on users/roles, PKI service, API GW service, etc.) to contribute to the management of the lifecycle of the microservice.

Figure 5:
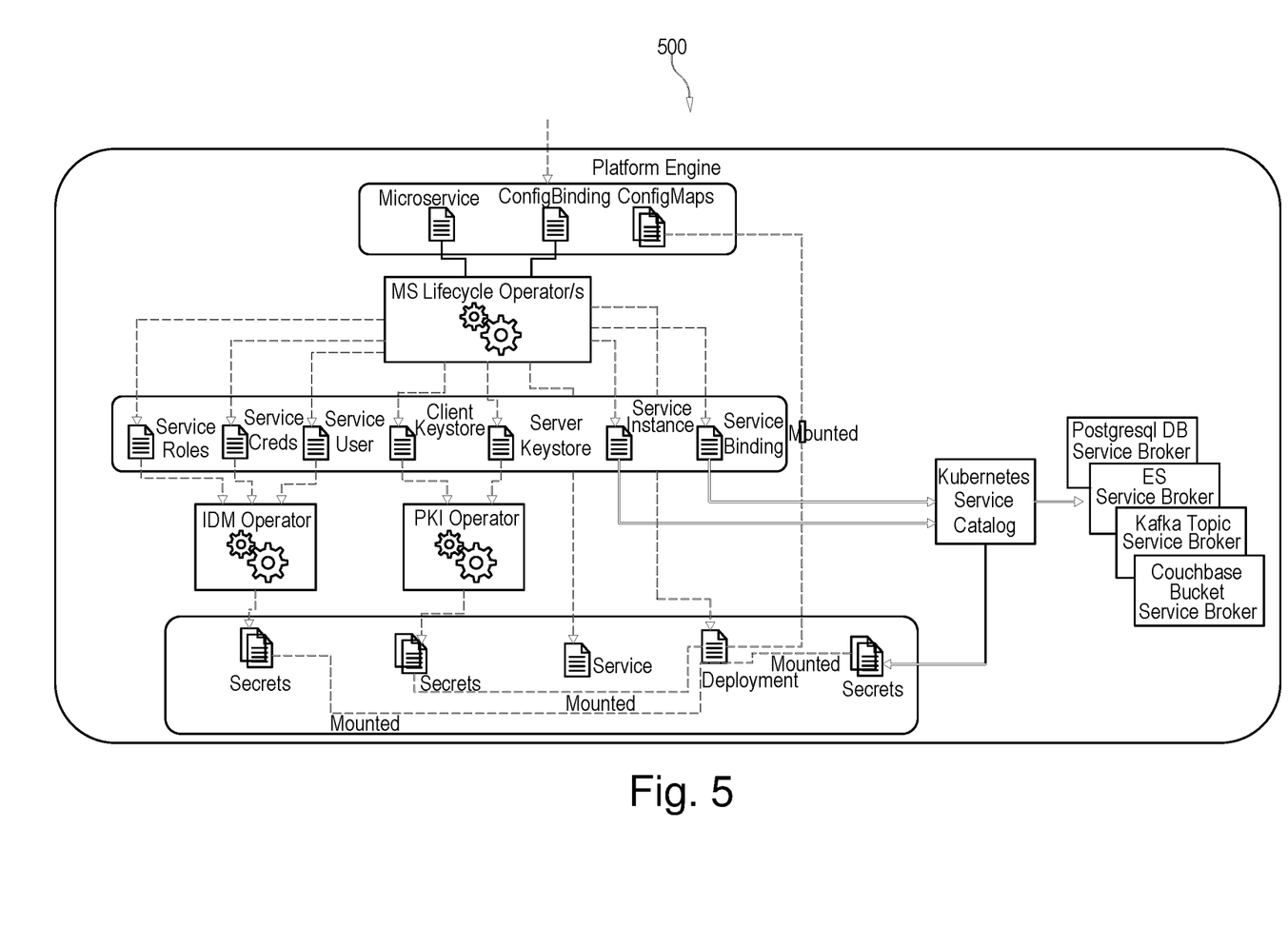
FIG. 5 illustrates a platform engine that uses a lifecycle operator to manage a lifecycle of a microservice, in accordance with one embodiment.
Figure 6:
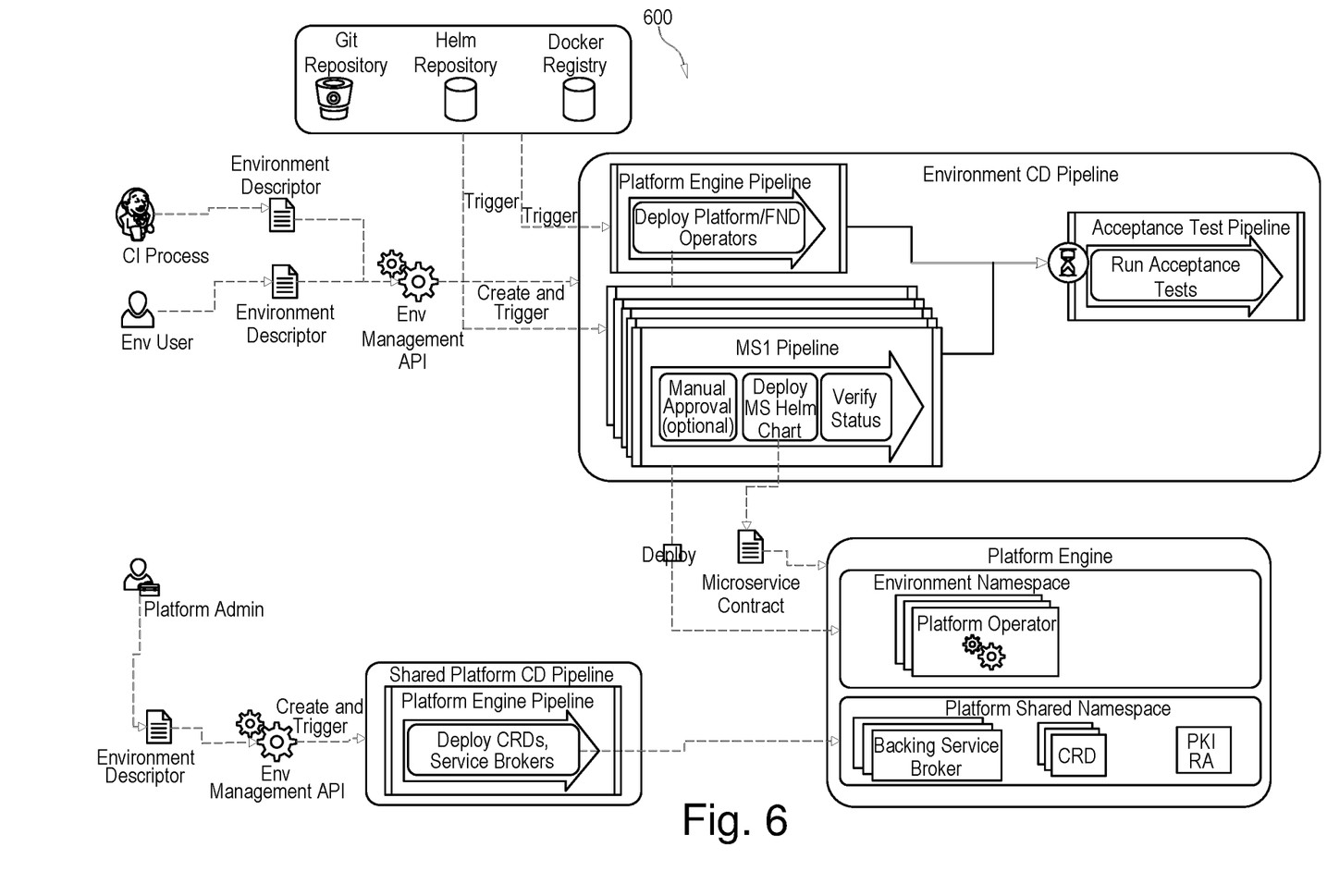
FIG. 6 illustrates a platform that includes the platform engine of FIG. 5, in accordance with one embodiment.

FIG. 5 illustrates a platform engine 500 that uses a lifecycle operator to manage a lifecycle of a microservice, in accordance with one embodiment. As an option, the platform engine 500 may be implemented in the context of the details of the previous figure and/or any subsequent figure(s). Of course, however, the platform engine 500 may be implemented in the context of any desired environment. Further, the aforementioned definitions may equally apply to the description below.

As shown, the platform engine receives specifications. The specifications include a microservice specification, a config binding specification, and config maps referenced by the config binding specification. A lifecycle operator uses the specifications to manage the lifecycle of the micro service. In the embodiment shown, the lifecycle operator uses the specifications to create resources to provision the microservice. The resources include service roles, service credentials (creds), service users, a client keystore, a server keystore, a service instance, a service binding, as well as the service and deployment instance.

Additional operators of the platform engine 500 may use those resources to also contribute to management of the lifecycle of the microservice. For example, as shown, an IDM operator uses the service roles, service credentials (creds) and service users created by the lifecycle operator to generate its own resources which include secrets to be used by the microservice for the users. As another example, as shown, a PKI operator uses the client keystore and server keystore to generate its own resources which include secrets to be used by the microservice for clients and servers.

In the embodiment shown, the service instance and service binding, as well as the secrets (user and client/server) are added to a Kubernetes service catalog. From this catalog, the microservice can be deployed using the resources provided via the operators. As an option, service brokers may access the Kubernetes service catalog to offer and/or deploy the microservice.

FIG. 6 illustrates a platform 600 that includes the platform engine 500 of FIG. 5, in accordance with one embodiment. Thus, the platform 600 may be implemented in the context of the details of the previous figure and/or any subsequent figure(s). Of course, however, the platform 600 may be implemented in the context of any desired environment. Further, the aforementioned definitions may equally apply to the description below.

As shown, a continuous integration (CI) process is used in one embodiment to provide an environment descriptor for a microservice. In another embodiment, an environment user may provide an environment descriptor for the microservice. The environment descriptor(s) are provided through an environment management API which triggers an environment continuous delivery (CD) pipeline.

The environment CD pipeline includes a platform engine pipeline that receives information from a Git repository, helm repository, and docker registry to execute a deploy platform function that deploys operators of the platform engine 500. The environment CD pipeline also includes a microservice (MS1) pipeline that receives information from a Git repository, helm repository, and docker registry to execute a deploy microservice helm chart function to provide a microservice contract to the platform engine. The microservice contract MS Contract may fully expose the Kubernetes PodTemplateSpec v1 core api as-is. Despite full exposure of the Pod api, the lifecycle operator may be able to enforce platform 600 rules by overriding and inserting elements into the specified Pod Template. Custom configuration that is microservice specific can be added to Pod template specification.

In an embodiment, the environment CD pipeline may further include an acceptance test pipeline, as shown, to run acceptance tests on the output of the platform engine pipeline of the environment CD pipeline and the microservice (MS1) pipeline of the environment CD pipeline.

Further a platform admin can provide an environment descriptor through the environment management API (or another instance thereof) to trigger a shared platform CD pipeline. The shared platform CD pipeline also includes a platform engine pipeline that deploys CRDs and service brokers to the platform engine 500. The platform engine 500 operates as described above with reference to FIG. 5.

Microservice adoption by the platform 600 can include mapping all microservices, defining a new microservice CRD based on the platform 600 specification for each microservice, marking existing deployment resources as disabled/depreciated, and/or marking existing service resources as disabled/depreciated. The microservice adoption pod template section can specify to clean all containers ports, clean all configmaps default environment variables/volumes/volumes mount, make sure environment variable MANAGEMENT_SERVER_PORT is still defined, clean subdomain includes—it will be defined as binding, clean all PKI environment variables, clean all PKI volumes, clean all PKI volumes mounts, make sure all custom environment variables are defined the same way, make sure the livenessProbe is defined and included in the same way, make sure the readinessProbe is defined and included in the same way, and make sure imagePullSecrets are defined and included the same way.

A dynamic configuration adoption by the platform 600 can include:

Mapping all the configmaps resources(include pki-configmap.yaml) per each microservice;

For each configmap resource defining a new CRD—ConfigBinding which hold the following configuration: ConfigMap name, Microservice selector labels which select list of microservice that should be bonded with the configmap, Priority of configmap—relative priority to notify msnext the orders of the configmap, Bounce—default is true and causes pod restarts on configmap/configbinding change, and bindingType: configmap #optional: default nil/configmap, values (configmap/secret/nil);

Bounding configmaps under "/deployments/config/"; and
Bounding secrets under "/run/secrets/".

For an application that is formed using the microservice, the application should adopt the platform microservice contract, the application should adopt the platform configbinding contract, the application should use MSNEXT_JAVA_OPTS_TLS environment variable to get PKI java options, and the application should use SPRING_CONFIG_ADDITIONAL_LOCATION environment variable to get all mount locations (Configmaps/Secrets) that defined by the platform engine 500 as part of the microservice deployment.

Adoption verification by the platform 600 can include:

Microservice Deployment resources are created successfully;

MSNEXTJVM argument are defined properly as part of the microservice; container

PKI configuration is defined properly;

ConfigMaps are bounded to Microservices and mounted as part of the microservice container;

Microservice Pods are started successfully;

Pod Replication is working properly based on the microservice spec;

Microservice passed functional tests;

Microservice passed integration tests.

Figure 7:
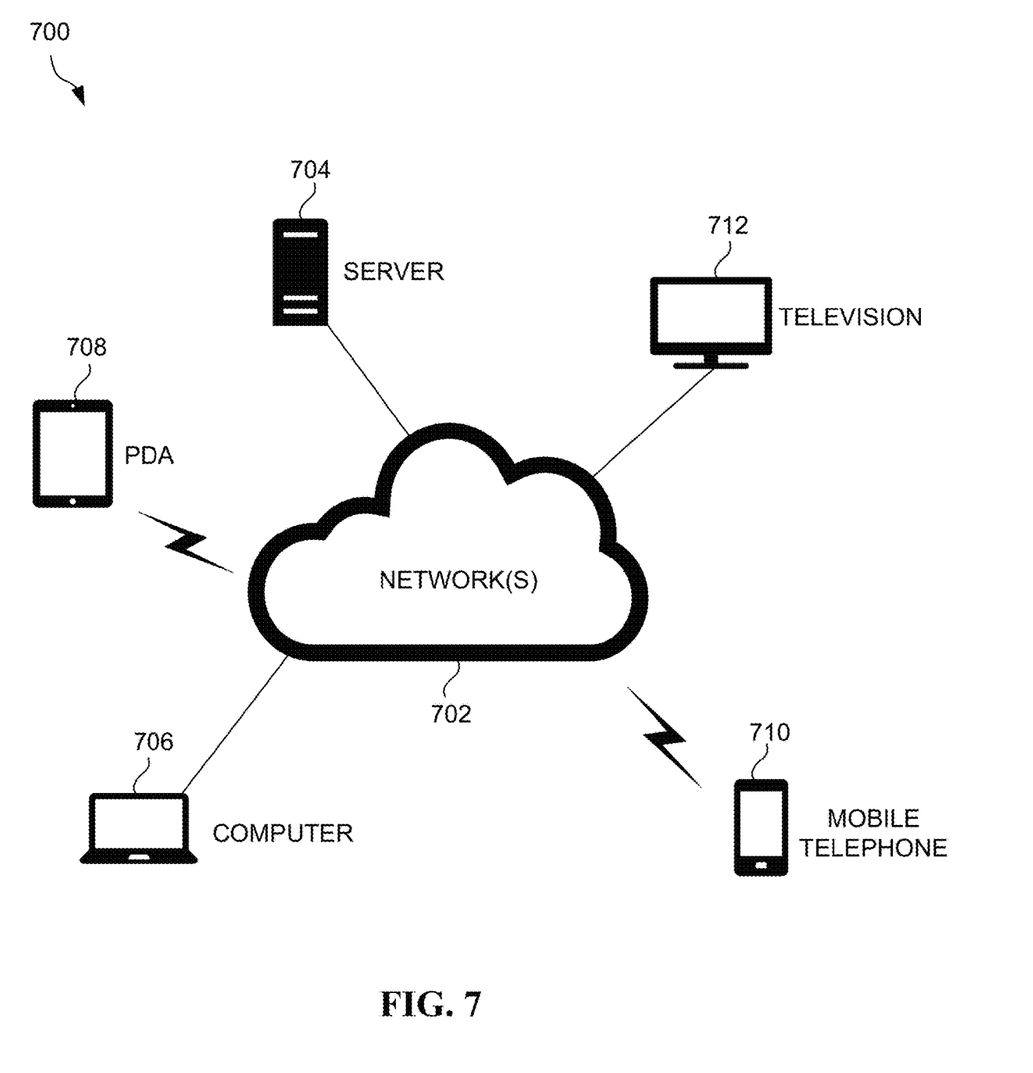
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
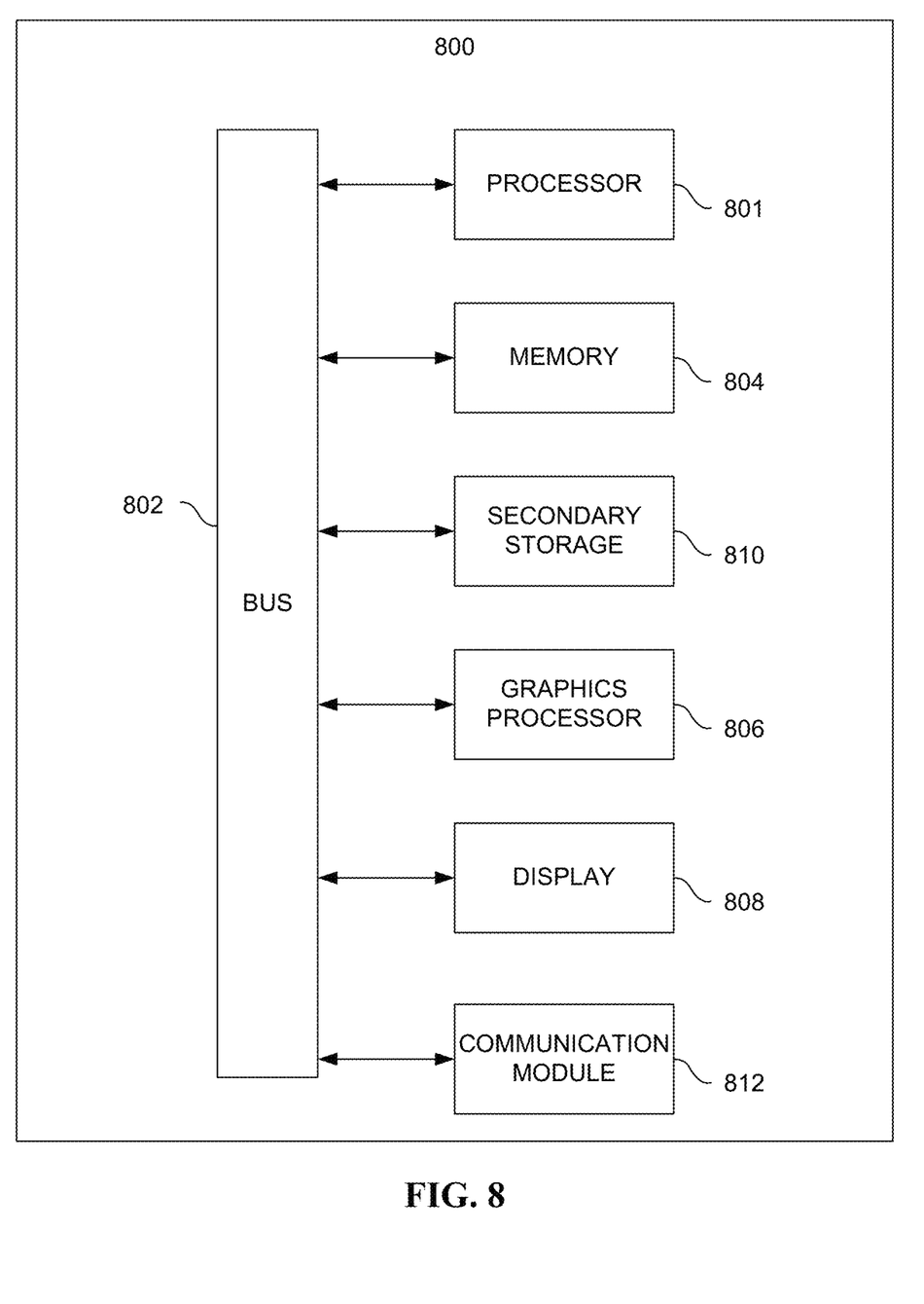
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
 identifying a plurality of specifications for a microservice, the microservice capable of being deployed with or without other microservices to form an application that provides a service to end users, wherein the plurality of specifications define the microservice and include:
  a microservice specification that is a declarative description of the microservice which indicates image details for the microservice, users for the microservice, technical roles for the microservice, and a configuration for the microservice, and
  a config binding specification that binds a predefined configuration for the microservice, wherein the predefined configuration is not included in the microservice specification and is not uniquely defined for the microservice, and wherein the config binding specification is usable to determine all configmaps targeting the microservice;
 managing a lifecycle of the microservice, using a lifecycle operator and the plurality of specifications, wherein the lifecycle of the microservice includes a series of stages for the microservice including creation, deployment, operation, and retirement of the microservice, and wherein the lifecycle operator orchestrates activities corresponding to the stages for the microservice including:
  using the specifications to create resources to provision the microservice, the resources including service roles, service credentials, service users, a client keystore, a server keystore, a service instance, a service binding, and a service and deployment instance,
  discovering the configmaps targeting the microservice, using the config binding specification, and
  mounting the configmaps into Kubernetes pods for the microservice;
 invoking, by the lifecycle operator, additional operators for management of the microservice, wherein the additional operators use the resources created by the lifecycle operator to contribute to the management of the lifecycle of the microservice, the additional operators including:
  an IDM operator that uses the service roles, service credentials and service users created by the lifecycle operator to generate its own resources which include secrets to be used by the microservice for users, and
  a PKI operator that uses the client keystore and the server keystore to generate its own resources which include secrets to be used by the microservice for clients and servers;
wherein the lifecycle operator performs one or more actions when a step in the management of the lifecycle fails, the one or more actions being specified in a lifecycle contract for the microservice that includes the plurality of specifications,
wherein the lifecycle operator decides when to execute some steps in the lifecycle and when to put some steps in the lifecycle on pause for improving the performance of a system, and
wherein a feedback loop is utilized between the additional operators and the lifecycle operator to enable the one or more actions to take when the step in the management of the lifecycle fails and to enable the improving of the performance of the system, the feedback loop being provided using storage of the microservice specification that the lifecycle operator will read;
wherein the lifecycle operator bounces a microservice pod when a corresponding one of the configmaps changes, based on a bounce policy.

2. The non-transitory computer readable medium of claim 1, wherein the lifecycle operator is a Kubernetes operator.

3. The non-transitory computer readable medium of claim 1, wherein the lifecycle operator manages the lifecycle of the microservice by transforming the microservice specification into low-level steps and resources to provision the microservice.

4. The non-transitory computer readable medium of claim 3, wherein the lifecycle operator orchestrates a hierarchy of operators, where the top parent operator in the hierarchy is the lifecycle operator and the additional operators are child operators to the lifecycle operator.

5. The non-transitory computer readable medium of claim 4, wherein the lifecycle operator uses information of failure of the child operators to stop, rerun, or partially execute the lifecycle contract, via the feedback loop between the additional operators and the lifecycle operator.

6. The non-transitory computer readable medium of claim 3, wherein the resources include a deployment with a same name as the microservice.

7. The non-transitory computer readable medium of claim 1, wherein the lifecycle operator is a component of a platform that utilizes the microservice to provide the application.

8. The non-transitory computer readable medium of claim 7, wherein the platform includes the additional operators.

9. A method, comprising:
identifying a plurality of specifications for a microservice, the microservice capable of being deployed with or without other microservices to form an application that provides a service to end users, wherein the plurality of specifications define the microservice and include:
  a microservice specification that is a declarative description of the microservice which indicates image details for the microservice, users for the microservice, technical roles for the microservice, and a configuration for the microservice, and
  a config binding specification that binds a predefined configuration for the microservice, wherein the predefined configuration is not included in the microservice specification and is not uniquely defined for the microservice, and wherein the config binding specification is usable to determine all configmaps targeting the microservice;
managing a lifecycle of the microservice, using a lifecycle operator and the plurality of specifications, wherein the lifecycle of the microservice includes a series of stages for the microservice including creation, deployment, operation, and retirement of the microservice, and wherein the lifecycle operator orchestrates activities corresponding to the stages for the microservice including:
  using the specifications to create resources to provision the microservice, the resources including service roles, service credentials, service users, a client keystore, a server keystore, a service instance, a service binding, and a service and deployment instance,
  discovering the configmaps targeting the microservice, using the config binding specification, and
  mounting the configmaps into Kubernetes pods for the microservice;
invoking, by the lifecycle operator, additional operators for management of the microservice, wherein the additional operators use the resources created by the lifecycle operator to contribute to the management of the lifecycle of the microservice, the additional operators including:
  an IDM operator that uses the service roles, service credentials and service users created by the lifecycle operator to generate its own resources which include secrets to be used by the microservice for users, and
  a PKI operator that uses the client keystore and the server keystore to generate its own resources which include secrets to be used by the microservice for clients and servers;
wherein the lifecycle operator performs one or more actions when a step in the management of the lifecycle fails, the one or more actions being specified in a lifecycle contract for the microservice that includes the plurality of specifications,
wherein the lifecycle operator decides when to execute some steps in the lifecycle and when to put some steps in the lifecycle on pause for improving the performance of a system, and
wherein a feedback loop is utilized between the additional operators and the lifecycle operator to enable the one or more actions to take when the step in the management of the lifecycle fails and to enable the improving of the performance of the system, the feedback loop being provided using storage of the microservice specification that the lifecycle operator will read;
wherein the lifecycle operator bounces a microservice pod when a corresponding one of the configmaps changes, based on a bounce policy.

10. A system, comprising:
a non-transitory memory storing instructions; and
one or more processors in communication with the non-transitory memory that execute the instructions to perform a method comprising:
identifying a plurality of specifications for a microservice, the microservice capable of being deployed with or without other microservices to form an application that provides a service to end users, wherein the plurality of specifications define the microservice and include:

a microservice specification that is a declarative description of the microservice which indicates image details for the microservice, users for the microservice, technical roles for the microservice, and a configuration for the microservice, and a config binding specification that binds a predefined configuration for the microservice, wherein the predefined configuration is not included in the microservice specification and is not uniquely defined for the microservice, and wherein the config binding specification is usable to determine all configmaps targeting the microservice;

managing a lifecycle of the microservice, using a lifecycle operator and the plurality of specifications, wherein the lifecycle of the microservice includes a series of stages for the microservice including creation, deployment, operation, and retirement of the microservice, and wherein the lifecycle operator orchestrates activities corresponding to the stages for the microservice including:

using the specifications to create resources to provision the microservice, the resources including service roles, service credentials, service users, a client keystore, a server keystore, a service instance, a service binding, and a service and deployment instance, discovering the configmaps targeting the microservice, using the config binding specification, and mounting the configmaps into Kubernetes pods for the microservice;

invoking, by the lifecycle operator, additional operators for management of the microservice, wherein the additional operators use the resources created by the lifecycle operator to contribute to the management of the lifecycle of the microservice, the additional operators including:

an IDM operator that uses the service roles, service credentials and service users created by the lifecycle operator to generate its own resources which include secrets to be used by the microservice for users, and a PKI operator that uses the client keystore and the server keystore to generate its own resources which include secrets to be used by the microservice for clients and servers;

wherein the lifecycle operator performs one or more actions when a step in the management of the lifecycle fails, the one or more actions being specified in a lifecycle contract for the microservice that includes the plurality of specifications, wherein the lifecycle operator decides when to execute some steps in the lifecycle and when to put some steps in the lifecycle on pause for improving the performance of a system, and wherein a feedback loop is utilized between the additional operators and the lifecycle operator to enable the one or more actions to take when the step in the management of the lifecycle fails and to enable the improving of the performance of the system, the feedback loop being provided using storage of the microservice specification that the lifecycle operator will read;

wherein the lifecycle operator bounces a microservice pod when a corresponding one of the configmaps changes, based on a bounce policy.

\* \* \* \* \*